(12) United States Patent
O'Keene et al.

(10) Patent No.: US 7,722,002 B2
(45) Date of Patent: May 25, 2010

(54) MOVABLE EXTENSION ASSEMBLY FOR A MOUNTING SYSTEM

(75) Inventors: Dugan O'Keene, Forest Park, IL (US); William Phuong Lam, Brookfield, IL (US)

(73) Assignee: Peerless Industries, Inc., Melrose Park, IL (US)

( * ) Notice: Subject to any disclaimer, the term of this patent is extended or adjusted under 35 U.S.C. 154(b) by 300 days.

(21) Appl. No.: 11/732,871

(22) Filed: Apr. 5, 2007

(65) Prior Publication Data

US 2007/0235614 A1   Oct. 11, 2007

Related U.S. Application Data

(60) Provisional application No. 60/791,063, filed on Apr. 11, 2006.

(51) Int. Cl.
*E04G 3/00* (2006.01)

(52) U.S. Cl. .............. 248/274.1; 248/220.21; 248/286.1; 248/917; 248/920; 248/923

(58) Field of Classification Search ............. 248/284.1, 248/220.21, 286.1, 287.1, 917–923
See application file for complete search history.

(56) References Cited

U.S. PATENT DOCUMENTS

| | | | |
|---|---|---|---|
| 6,604,722 B1 * | 8/2003 | Tan | 248/276.1 |
| D493,800 S | 8/2004 | Pfister et al. | |
| D494,596 S | 8/2004 | Pfister | |
| D497,537 S | 10/2004 | O'Keene et al. | |
| 6,923,413 B2 * | 8/2005 | Dozier | 248/294.1 |
| D530,595 S | 10/2006 | Lam et al. | |
| 7,152,836 B2 | 12/2006 | Pfister et al. | |
| 7,300,029 B2 * | 11/2007 | Petrick et al. | 248/285.1 |
| 2002/0179801 A1 * | 12/2002 | Kim | 248/441.1 |
| 2005/0092890 A1 * | 5/2005 | Liao | 248/466 |
| 2005/0236543 A1 * | 10/2005 | O'Neil | 248/286.1 |
| 2006/0065800 A1 * | 3/2006 | Bremmon | 248/274.1 |

* cited by examiner

*Primary Examiner*—Amy J Sterling
(74) *Attorney, Agent, or Firm*—Foley & Lardner LLP

(57) ABSTRACT

An improved system for securing a display device mounting bracket to a surface mounting bracket in a mounting system. A fastener connects to a movable extension component that is movably engaged with the device mounting bracket. When a device mounting bracket has been correctly positioned relative to the surface mounting bracket, the movable extension component is moved until a portion of the surface mounting bracket is positioned between the device mounting bracket and the movable extension component, thereby preventing the device mounting bracket from moving away from the surface mounting bracket.

23 Claims, 6 Drawing Sheets

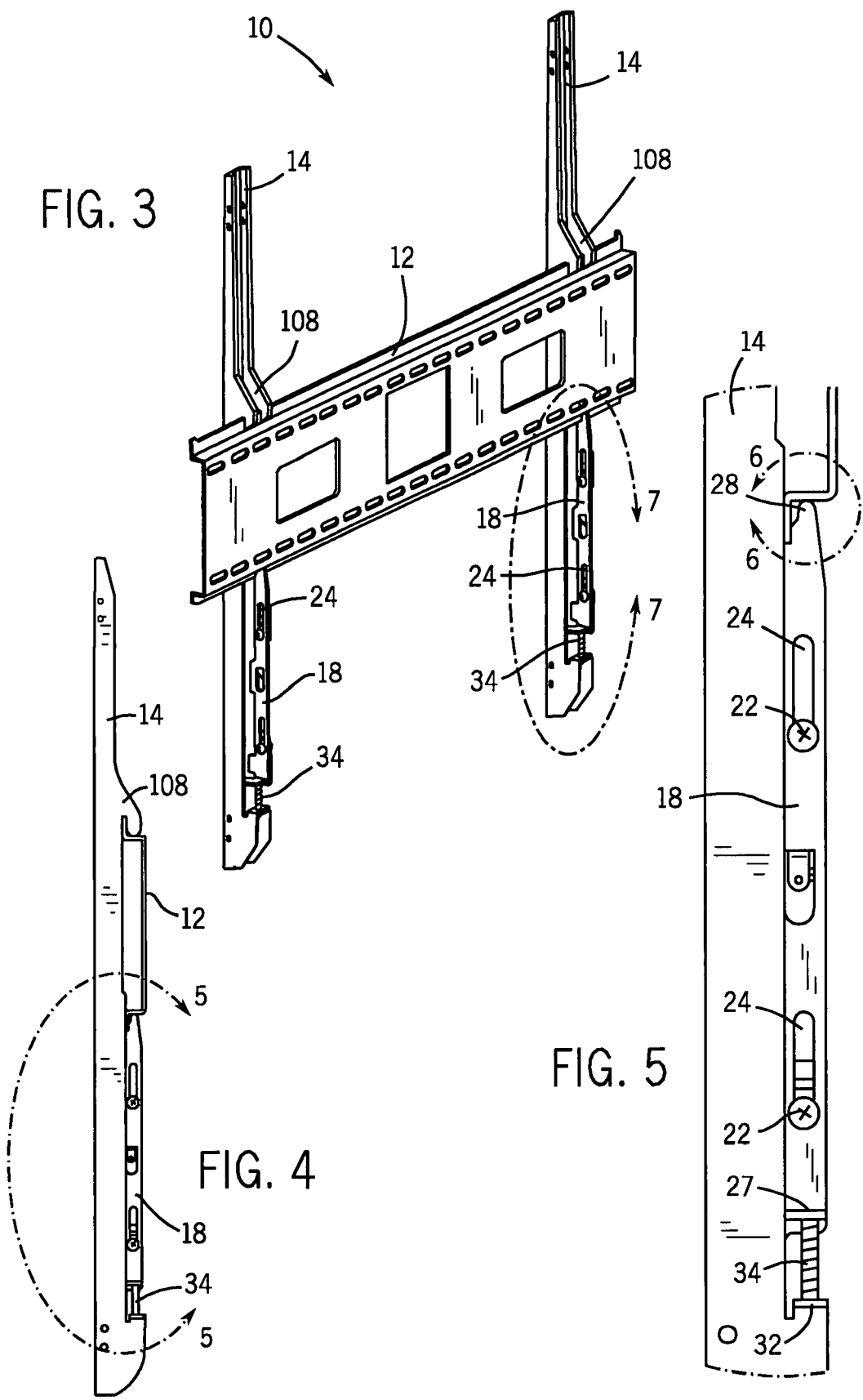

FIG. 6
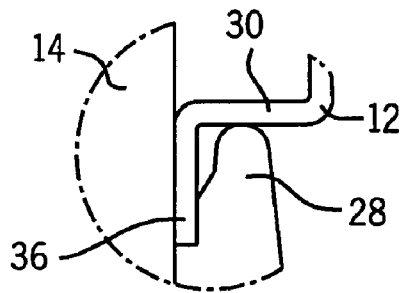
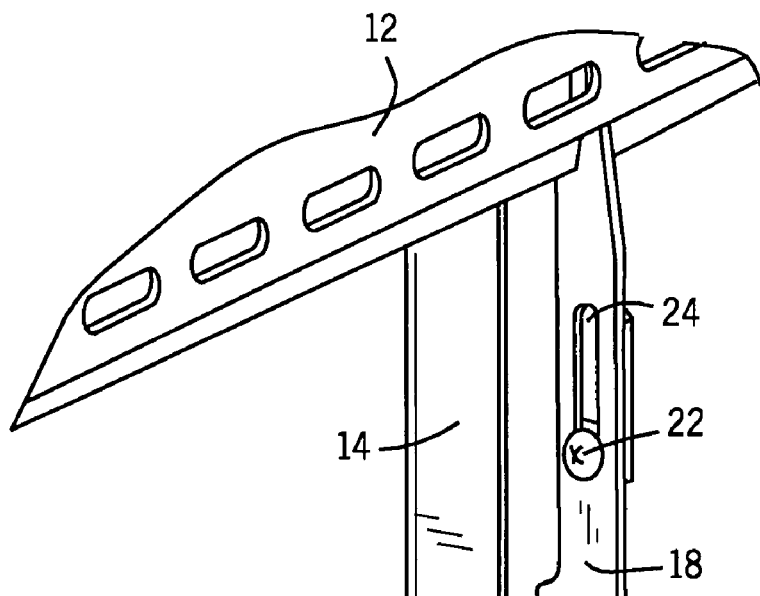
FIG. 7

MOVABLE EXTENSION ASSEMBLY FOR A MOUNTING SYSTEM

CROSS-REFERENCE TO RELATED APPLICATIONS

The present application claims priority to U.S. Provisional Patent Application No. 60/791,063, filed Apr. 11, 2006 and incorporated herein by reference in its entirety.

FIELD OF THE INVENTION

The present invention relates generally to systems for mounting display devices such as flat panel televisions. More particularly, the present invention relates to systems for securing a mounting system's device mounting bracket in position during an installation process.

BACKGROUND OF THE INVENTION

In recent years, flat panel televisions have become enormously popular in both commercial and residential sectors. As the prices for plasma and liquid crystal display (LCD) flat panel displays have continued to fall, and the quality for the same devices have improved, more and more businesses and individuals have purchased such devices for both home and business entertainment purposes.

One of the advantages of flat panel televisions units that customers have found particular appealing is their relatively low thickness. Because conventional "tube" televisions have a relatively large depth, the display options for such devices are quite limited. In the residential setting, most users require a television stand or large entertainment center to store the television. Such stands or entertainment centers can take up significant floor space, which is often undesirable. In the commercial or educational setting, users will often install large overhead mounting systems that can contain the television. However these systems usually require professional installation. With flat panel televisions, on the other hand, users are presented with a relatively new option: mounting the television directly to the wall. By mounting the television to the wall, a person can eliminate the need to take up potentially valuable floor space.

Although the introduction of flat panel televisions on a wide scale has presented new opportunities to both residential and commercial customers, it has also presented new challenges. In particular, flat panel televisions, while usually having significantly smaller depth or profile than conventional "tube" televisions, tend to be quite heavy. Particularly for flat panel televisions with large screens, this weight can become also prohibitively great. With such large weights involved, it is especially important that users can easily, safely, and securely mount the devices without having to make substantial adjustments.

A number of conventional wall mounting systems involve the use of a relatively large wall mounting plate and a plurality of adapter brackets that are configured to attach to the back of a television or other display device. Each adapter bracket typically includes a screw or similar fastener that is used to secure the adapter bracket relative to the wall mounting plate. One such adapter bracket is shown at 100 in FIG. 1. The conventional adapter bracket 100 includes a pair of side portions which bound a mounting contact portion 102. An upper hook 108 and a lower guiding portion 110 are located on each side portion 104, which together define a receiving region 122 for the wall mounting plate. The upper hook 108 is formed on each of the side portions 104 at substantially the same position. Each upper hook 108 and/or lower guiding portion 110 may be formed as one piece with the rest of the adapter bracket 100 or, alternatively, each upper hook 108 and/or lower guiding portion 110 may comprise a separate component which is coupled to the adapter bracket 100 in the appropriate position. A plurality of openings 112 are used to connect the conventional adapter bracket 100 to a television or other flat panel display.

The lower guiding portion 110 includes a longitudinal surface 120, through which a fastener may be threaded. When the conventional adapter bracket 100 has been correctly positioned relative to the wall mounting plate (with the conventional adapter bracket 100 already being coupled to a television or display device), the movement upwards relative to the longitudinal surface 120, causes it to move through an opening in the longitudinal surface 120 and press against the wall mounting plate. This action impedes the conventional adapter bracket 100 from being pulled away from the wall mounting plate.

Although the system discussed in FIG. 1 is useful, it relies upon the ability of an installer to access the fastener when the conventional adapter bracket 100, which is attached to a television during installation, has been mated with the wall mounting bracket. However, when correctly positioned, the space between the television and the wall or other mounting surface is quite small, in the range of a few inches on occasion. When smaller televisions are being mounted, the conventional adapter bracket 100 does not need to be very long, and an installer may only have to place his or her hand in the open space. However, flat panel televisions are becoming increasingly large in size, now reaching or even exceeding 63" in screen size. This increase in size inherently results in a substantial increase in weight for the unit. Because of this weight, the various mounting system components must also become larger in size. The end result of this increase in size is that the fastener on the conventional adapter bracket 100 becomes much more difficult to reach. For example, when a 23" television is being mounted, the installer may only have to place his hand behind the television to reach the fastener. With a 63" television on the other hand, the installer may have to place much, if not all of his entire arm behind the television before reaching the fastener. With the aforementioned small space between the television and the wall, this can become difficult or even impossible for the average person.

It would therefore be desirable to provide an improved mounting system that allows an installer to quickly and easily secure the system's adapter brackets to the wall mounting bracket, even when very large televisions or other display devices are being mounted.

SUMMARY OF THE INVENTION

The present invention comprises an improved system for securing a display device mounting bracket to a surface mounting bracket in a mounting system. A fastener connects to a movable extension component that is movably engaged with the device mounting bracket. When the device mounting bracket has been correctly positioned relative to the surface mounting bracket, the movable extension component is moved until a portion of the surface mounting bracket is positioned between the device mounting bracket and the movable extension component, thereby preventing the device mounting bracket from moving relative to the surface mounting bracket.

The present invention makes it much easier for an installer to secure the device mounting brackets to the surface mounting bracket than is otherwise possible in conventional systems designed to hold large screen flat panel displays. With the present invention, the fastener can be accessed at or near the bottom of the device mounting bracket, resulting in an easy installation process when mounting large flat screen televisions.

These and other advantages and features of the invention, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

FIG. 3 is a second perspective view of the mounting system of FIG. 2, with the mounting system rotated about ninety degrees;

FIG. 4 is a side view of the mounting system of FIGS. 1 and 2;

FIG. 5 is a side view showing the interaction between a display bracket, an extender bracket, and a wall bracket when the mounting system is in a secured position;

FIG. 6 is an enlarged side view of a portion of the mounting system of FIGS. 1-3;

FIG. 7 is a perspective view showing a portion of the mounting system in a secure position;

DETAILED DESCRIPTION OF THE PREFERRED EMBODIMENTS

Figure 1:
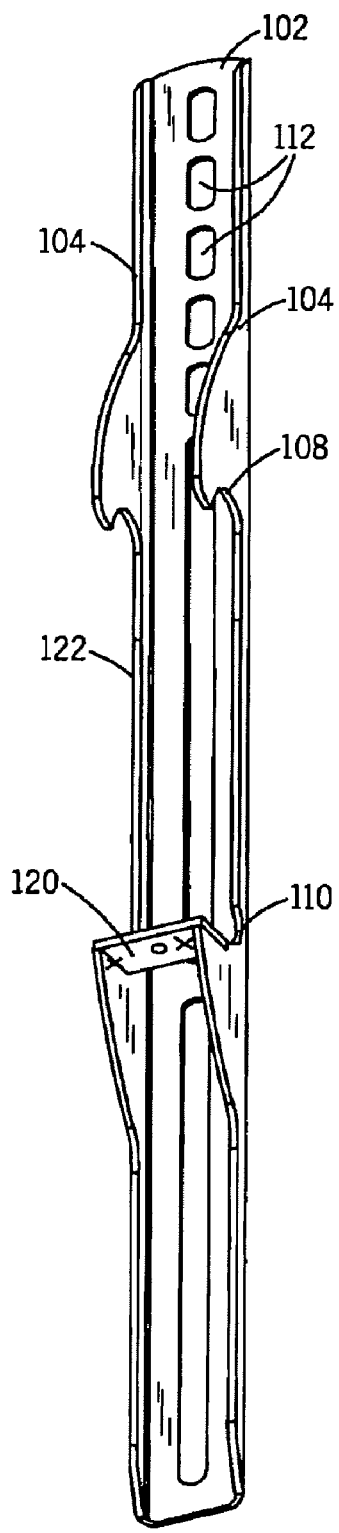
FIG. 1 is a perspective view of a conventional adapter bracket.
Figure 2:
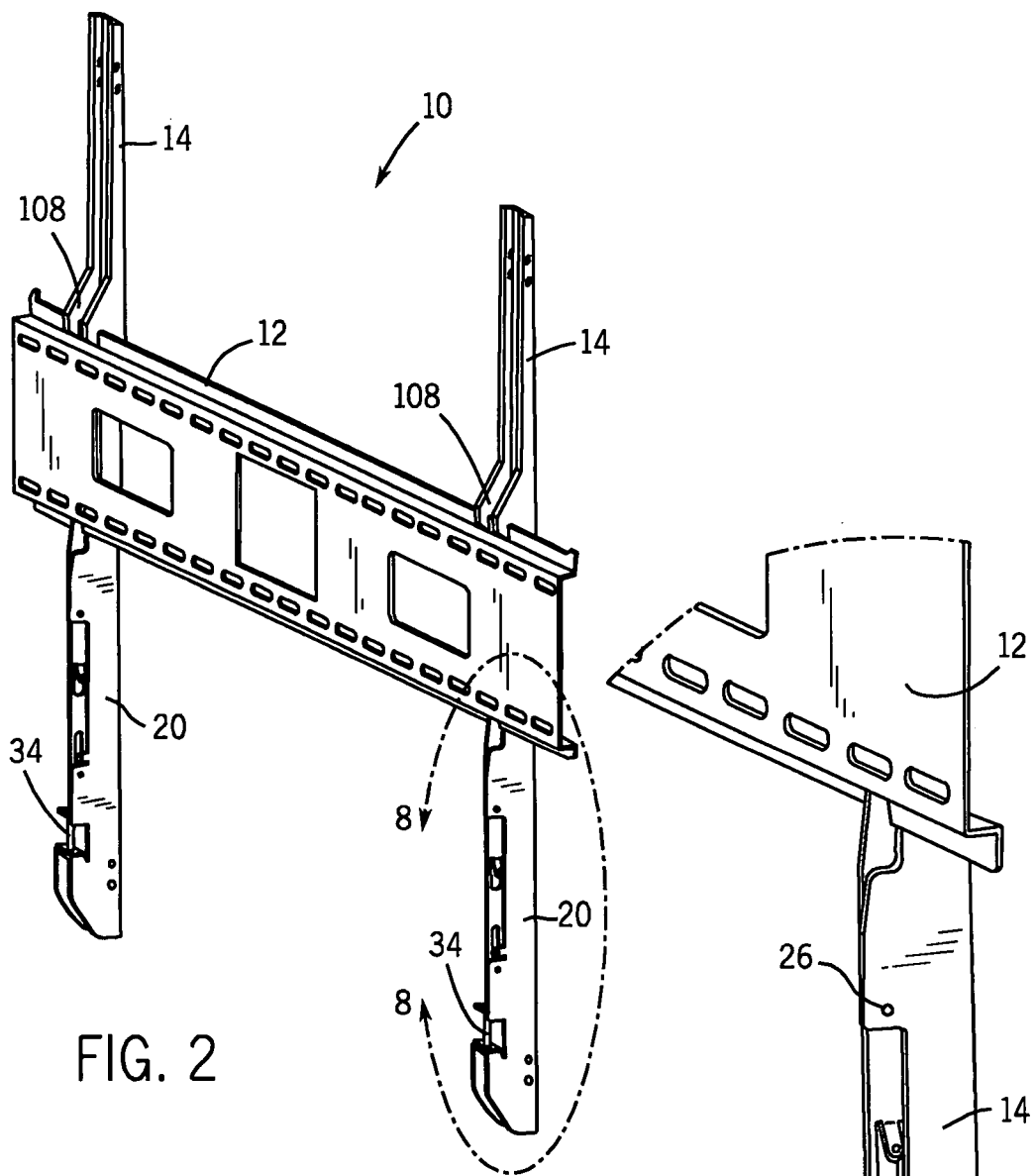
FIG. 2 is a first perspective view of a mounting system constructed in accordance with one embodiment of the present invention.

FIGS. 2-8 show a mounting system 10 constructed in accordance with one embodiment of the present invention. As shown in FIGS. 2 and 3, the mounting system 10 includes a surface mounting bracket 12 and a plurality of device mounting brackets 14. In the embodiment of the invention shown in FIGS. 2-8, two device mounting brackets 14 are used. However, virtually any number of device mounting brackets 14 may be used depending upon factors such as the size and weight of the item to be mounted. The surface mounting bracket 12 is configured to be mounted to a wall or other flat surface via a variety of surface mounting bracket openings, while the device mounting brackets 14 are configured to attach to the back of a display unit such as a flat panel television. Like the conventional mounting system shown 10 in FIG. 1, the device mounting brackets 14 include an upper hook portion 108 for accepting an upper portion of the surface mounting bracket 12.

FIGS. 3-5 and 7-8 show a portion of a device mounting bracket 14 and the surface mounting bracket 12. As is shown in these figures, an extender member 18 is movably connected to a side surface 20 of the device mounting bracket 14 below the surface mounting bracket 12. In one embodiment of the invention, the extender member 18 comprises an extender bracket. In other embodiments of the invention, items such as a rod or pin can be used instead of an extender bracket. Additionally, it is possible for the extender member 18 to be movably contained by the side surface 20 of the device mounting bracket 14 below the surface mounting bracket. In the embodiment shown in FIGS. 3-5 and 7-8, a pair of extender member fasteners 22 pass through respective guide paths 24 in the extender member 18 and corresponding openings 26 in the side surface 20 of the device mounting bracket 14. In this particular embodiment of the invention, the guide paths 24 comprise slots which permit the extender member fasteners 22 to slide therewithin.

The extender member 18 is bounded by a lower contact portion 27 and an upper contact portion 28. As is most clearly shown in FIG. 6, the upper contact portion 28 is shaped and sized to contact a lower mounting portion 30 of the surface mounting bracket 12 when the mounting system 10 is secure. In the embodiment shown in FIGS. 2-8, the lower contact portion 27 is formed as one piece with the rest of the extender member 18, with the lower contact portion 27 being substantially perpendicular to the rest of the extender member 18. It is also possible, however, for the lower contact portion 27 to be a separate piece that is connected to the rest of the extender member 18 via a conventionally known mechanism, such as welding.

Figure 8:
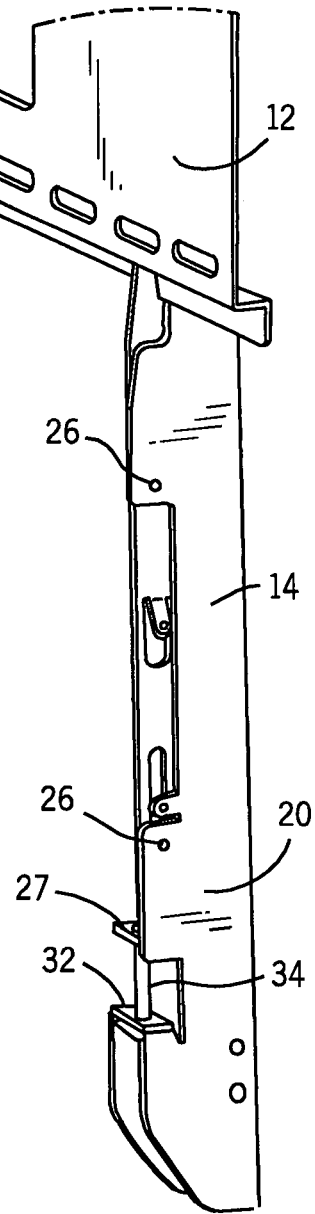
FIG. 8 is a reverse perspective view of the mounting system portion of FIG. 7.

As shown in FIGS. 5, 7 and 8, a lower portion of the device mounting bracket 14 includes a security fastener holder 32 for maintaining a security fastener 34. In one embodiment of the present invention, the security fastener 34 comprises a screw that is capable of moving upwards or downwards within the security fastener holder 32 when rotated. In other embodiments of the invention, the security fastener 35 comprises items such as a ratchet, a plunger or a latch. In the embodiment depicted in FIGS. 2-8, the security fastener holder 32 comprises a flat surface that runs substantially parallel to the lower contact portion 27 of the extender member 18.

Figure 10:
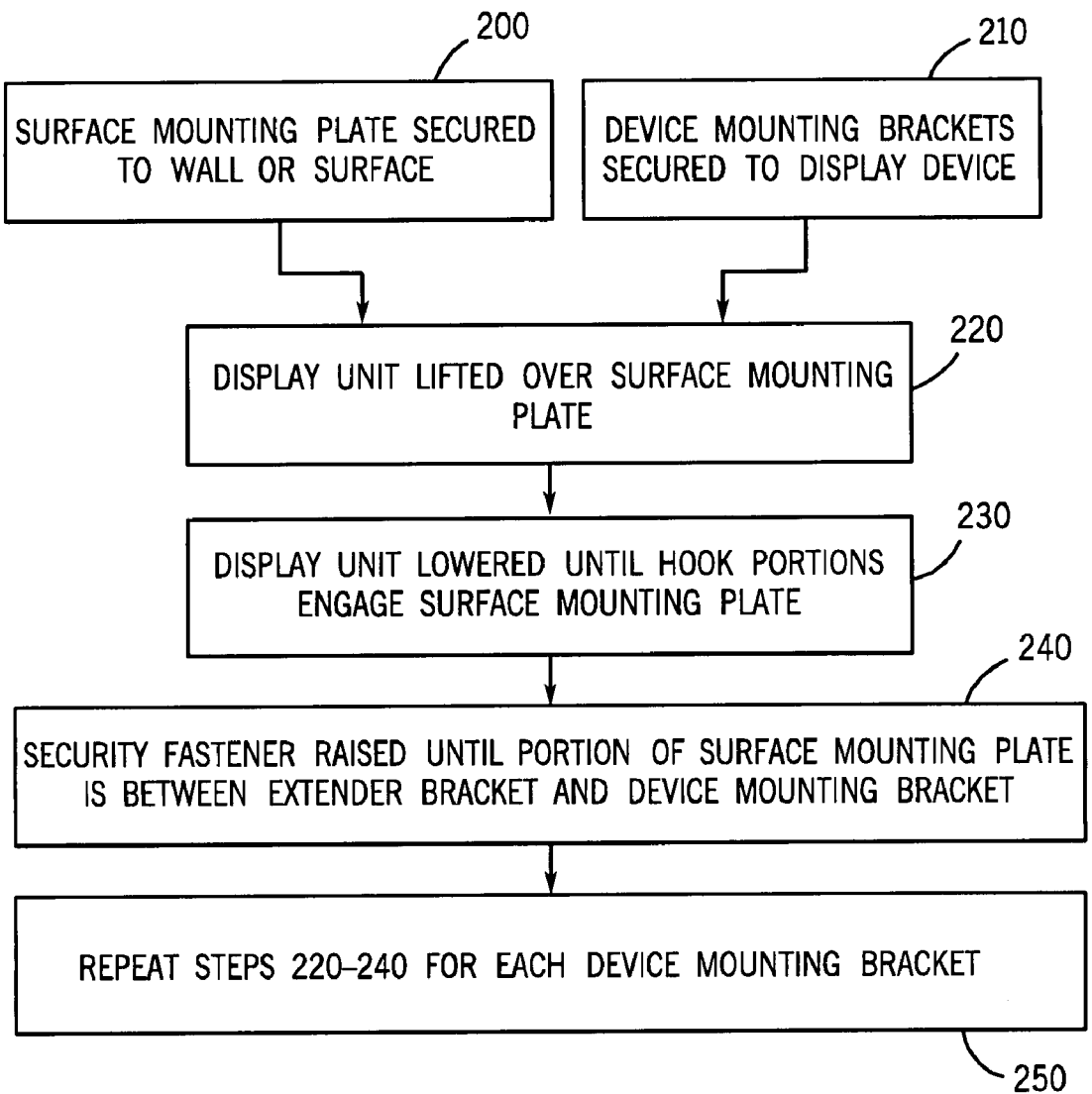
FIG. 10 is a flow chart showing a process for mounting a display device according to one embodiment of the present invention.

FIG. 10 is a flow chart showing the process by which the mounting system 10 of the present invention is mounted. When a user desires to mount a display unit to a wall or other surface, he secures the surface mounting bracket 12 to the wall or surface (step 200), and also mounts the number of necessary device mounting brackets 14 to the display device (step 210). Either of steps 200 or 210 can occur first. At this point, the device mounting brackets 14 should be configured such that the security fastener 34 on each device mounting bracket 14 has been lowered by a substantial amount within the respective security fastener holder 32. At step 220, the user lifts the display unit, with the device mounting brackets 14 attached, over the surface mounting bracket 12 such that the upper hooks 108 are slightly over the upper surface of the surface mounting bracket 12. At step 230, the user then slowly lowers the display device until the upper hook 108 for each device mounting bracket 14 "catches" the upper surface of the surface mounting bracket 12. At this point, the display device is not likely to fall off of the surface mounting bracket 12, but the mounting system is not completely secure. To more adequately secure the mounting system 10, the user proceeds to rotate the security fastener 34 on one of the device mounting brackets 14 at step 240. This rotation causes the security fastener 34 to move upwards (whether in the form of a screw, latch, ratchet, or other similar item), which results in it acting against the lower contact portion 27 of the extender member 18 that is associated with the device mounting bracket 14. This causes the extender member 18 to move upwards relative to the device mounting bracket 14 and the extender member fasteners 22 slide within the guide paths 24. Ultimately, the rotation of the security fastener 34 will cause the upper contact portion 28 of the extender member 18 to contact the lower mounting portion 30 of the surface mounting bracket 12. As can be clearly observed in FIGS. 5 and 6, when the upper contact portion 28 contacts the lower mounting portion 30, a ridge 36 of the lower mounting portion 30 is positioned between the upper contact portion 28 and the device mounting bracket 14. With this positioning, in combination with the upper portion of the surface mounting bracket 12 being positioned within the upper hook 108 of the device mounting bracket 14, the device mounting bracket 14 is impeded from being moved away from the surface mounting bracket 12 when pulled in a direction substantially perpendicular to the surface to which the surface mounting bracket 12 is secured. This process is then repeated for every other device mounting bracket 14 being used, and this repetition is represented at step 250.

Figure 9:
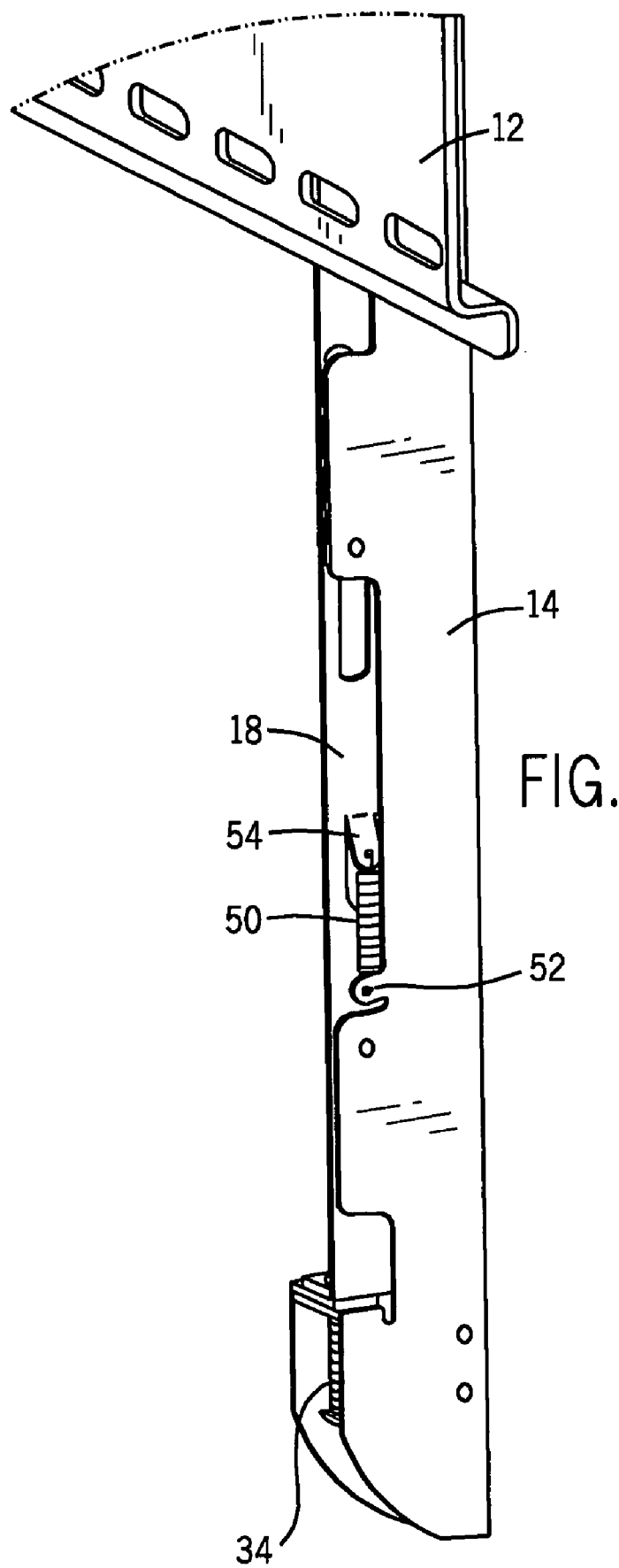
FIG. 9 is a reverse perspective view of a mounting system portion constructed in accordance with an alternative embodiment of the present invention.

FIG. 9 is a reverse perspective view of a portion of the mounting system 10 as constructed according to an alternative embodiment of the present invention. In the embodiment depicted in FIG. 9, a biasing member 50, in the form of a tension spring in one embodiment of the invention, is attached to the mounting bracket 14 via a mounting bracket tab 52. The biasing member 50 is also attached to the extender member 18 via an extender member tab 54. The biasing member 50 biases the extender member 18 away from the surface mounting bracket 12 and towards the lower portion of the mounting bracket 14 and the security fastener 34. This serves to aid the user in freeing the mounting bracket 14 (and associated device) from the surface mounting bracket 12 when necessary or desired.

A number of variations to the embodiment described in FIGS. 2-8 may be implemented. For example, it is possible for the various components to be reversed, such that a single component is attached to the television or other display device while multiple components are attached to the wall or other surface. It is also possible to include security fasteners 34 and extender brackets 18 at the top of the device mounting bracket 14 instead of or in addition to the bottom of the device mounting bracket 14.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A mounting system, comprising:
   a surface mounting bracket configured to attach to a surface;
   at least one device mounting bracket configured to attach to a display device and including a positioning region for accepting the surface mounting bracket;
   at least one extender member movably connected to one of the at least one device mounting bracket; and
   at least one security fastener each of which is movably connected to one of the at least one device mounting bracket and is in contact with one of the at least one extender member, the at least one security fastener being movable towards and away from the surface mounting bracket, the at least one security fastener configured to act on the at least one extender member upon movement of the at least one security fastener and thereby move the at least one extender member relative to the at least one device mounting bracket;
   wherein, when the surface mounting bracket is positioned within the positioning region, movement of the at least one security fastener towards the surface mounting bracket causes the at least one extender member to restrain the at least one device mounting bracket from moving away from the surface mounting bracket directly substantially perpendicular to the surface.

2. The mounting system of claim 1, wherein the each of the at least one security fastener is threadedly engaged with one of the at least one device mounting bracket.

3. The mounting system of claim 1, wherein each of the at least one extender member is slidably connected with one of the at least one device mounting bracket.

4. The mounting system of claim 3, wherein the slidable connection between each of the at least one extender member and one of the at least one device mounting bracket comprises at least one extender member fastener secured to the respective extender member and the respective device mounting bracket.

5. The mounting system of claim 4, wherein the each of the at least one extender member fastener is movable within a respective guide path formed within the respective extender member.

6. The mounting system of claim 1, wherein the at least one device mounting bracket includes a hook portion for accepting a portion of the surface mounting bracket.

7. The mounting system of claim 1, wherein the at least one device mounting bracket comprises two mounting brackets, and wherein the at least one extender member comprises two extender brackets.

8. The mounting system of claim 1, wherein the at least one extender member comprises at least one rod.

9. The mounting system of claim 1, wherein the at least one extender member comprises at least one pin.

10. A mounting system, comprising:
    a mounting plate;
    at least one mounting bracket including a positioning region for accepting the mounting plate;
    at least one extender member, each of which is movably connected to one of the at least one mounting bracket, each of the at least one extender member including a first portion selectively disengageable from the mounting plate when the mounting plate is positioned within the positioning region; and
    at least one security fastener each of which is movably connected to one of the at least one mounting bracket and is in contact with one of the at least one extender member, the at least one security fastener being movable towards and away from the mounting plate;
    wherein, when the mounting plate is positioned within the positioning region, movement of the at least one security fastener towards the mounting plate causes the at least one extender member to restrain the at least one mounting bracket from moving away from the mounting plate.

11. The mounting system of claim 10, wherein the each of the at least one security fastener is threadedly engaged with one of the at least one mounting bracket.

12. The mounting system of claim 10, wherein each of the at least one extender member is slidably connected with one of the at least one mounting bracket.

13. The mounting system of claim 12, wherein the slidable connection between each of the at least one extender member and one of the at least one mounting bracket comprises at least one extender member fastener secured to the respective extender member and the respective mounting bracket.

14. The mounting system of claim 13, wherein the each of the at least one extender member fastener is movable within a respective guide path formed within the respective extender member.

15. The mounting system of claim 10, wherein the at least one mounting bracket includes a hook portion for accepting a portion of the mounting plate.

16. The mounting system of claim 10, wherein the at least one mounting bracket comprises two mounting brackets, and wherein the at least one extender member comprises two extender members.

17. The mounting system of claim 10, further comprising at least one biasing member operatively connecting the at least one extender member to the at least one mounting bracket, the at least one biasing member biasing the at least one extender member away from the mounting plate.

18. A mounting system, comprising:
a primary mounting bracket configured to attach to a first object; and
a plurality of secondary mounting bracket assemblies, each secondary mounting bracket assembly including:
a secondary mounting bracket including a positioning region for accepting the primary mounting bracket;
an extender member movably engageable with the primary mounting bracket, and
a security fastener movably coupled to the secondary mounting bracket and in at least selective contact with the extender member, the security fastener capable of moving towards and away from the positioning region,
wherein the primary mounting bracket is positioned within the positioning region, movement of each security fastener towards the primary mounting bracket causes each extender member to restrain the respective secondary mounting bracket from moving away from the primary mounting bracket directly substantially perpendicular to the first object.

19. The mounting system of claim 18, wherein each secondary mounting bracket includes a hook portion for accepting a portion of the primary mounting bracket.

20. The mounting system of claim 18, wherein each extender member is slidably connected to its respective secondary mounting bracket.

21. The mounting system of claim 20, wherein the slidable connection between each extender member and its respective secondary mounting bracket comprises at least one extender member fastener coupled to the respective extender member and the respective secondary mounting bracket.

22. The mounting system of claim 21, wherein each extender member fastener is movable within a respective guide path formed within the extender member.

23. The mounting system of claim 22, wherein each guide path comprises a slot.

* * * * *